US005628022A

United States Patent [19]
Ueno et al.

[11] Patent Number: 5,628,022
[45] Date of Patent: May 6, 1997

[54] MICROCOMPUTER WITH PROGRAMMABLE ROM

[75] Inventors: Masahiro Ueno; Kenichi Ono; Toshitaka Yamamoto, all of Hitachi, Japan

[73] Assignee: Hitachi, Ltd., Tokyo, Japan

[21] Appl. No.: 252,358

[22] Filed: Jun. 1, 1994

[30] Foreign Application Priority Data

Jun. 4, 1993 [JP] Japan ..................... 5-134291

[51] Int. Cl.⁶ ............................................. G06F 12/00
[52] U.S. Cl. .................... 395/800; 395/430; 395/492; 395/497.04; 395/421.01
[58] Field of Search ............................ 395/800, 430, 395/492, 497.04, 421.01; 364/DIG. 1, DIG. 2

[56] References Cited

U.S. PATENT DOCUMENTS

| 4,497,031 | 1/1985 | Froehling et al. ............... 364/505 |
| 5,053,797 | 10/1991 | Samuels et al. ................ 354/322 |
| 5,077,832 | 12/1991 | Szczutkowski et al. ............ 455/89 |
| 5,132,716 | 7/1992 | Samuels et al. ................ 354/322 |
| 5,189,344 | 2/1993 | Rose ........................... 315/293 |
| 5,307,285 | 4/1994 | Storandt et al. ................ 364/489 |
| 5,327,531 | 7/1994 | Bealkowski et al. .............. 395/164 |
| 5,361,343 | 11/1994 | Kosonocky et al. ............... 395/425 |
| 5,487,161 | 1/1996 | Koenck et al. .................. 395/442 |

OTHER PUBLICATIONS

*Computer Architecture A Quantitative Approach*: Hennessy & Patterson [1990] Morgan Kaufmann Publishers, Inc., San Mateo, CA (p. 54).

*Primary Examiner*—Thomas G. Black
*Assistant Examiner*—Valerie Darbe
*Attorney, Agent, or Firm*—Antonelli, Terry, Stout & Kraus, LLP

[57] ABSTRACT

In a microcomputer with a programmable ROM, there is provided an external pin at which a mode select signal is entered so as to select one of three modes, including a MCU mode in which an application system is controlled by an application program which has been stored in the programmable ROM, a PROM mode in which the application program is written into the programmable ROM, and an inline mode in which predetermined data is written to a part of the programmable ROM with the microcomputer mounted on a user system.

9 Claims, 4 Drawing Sheets

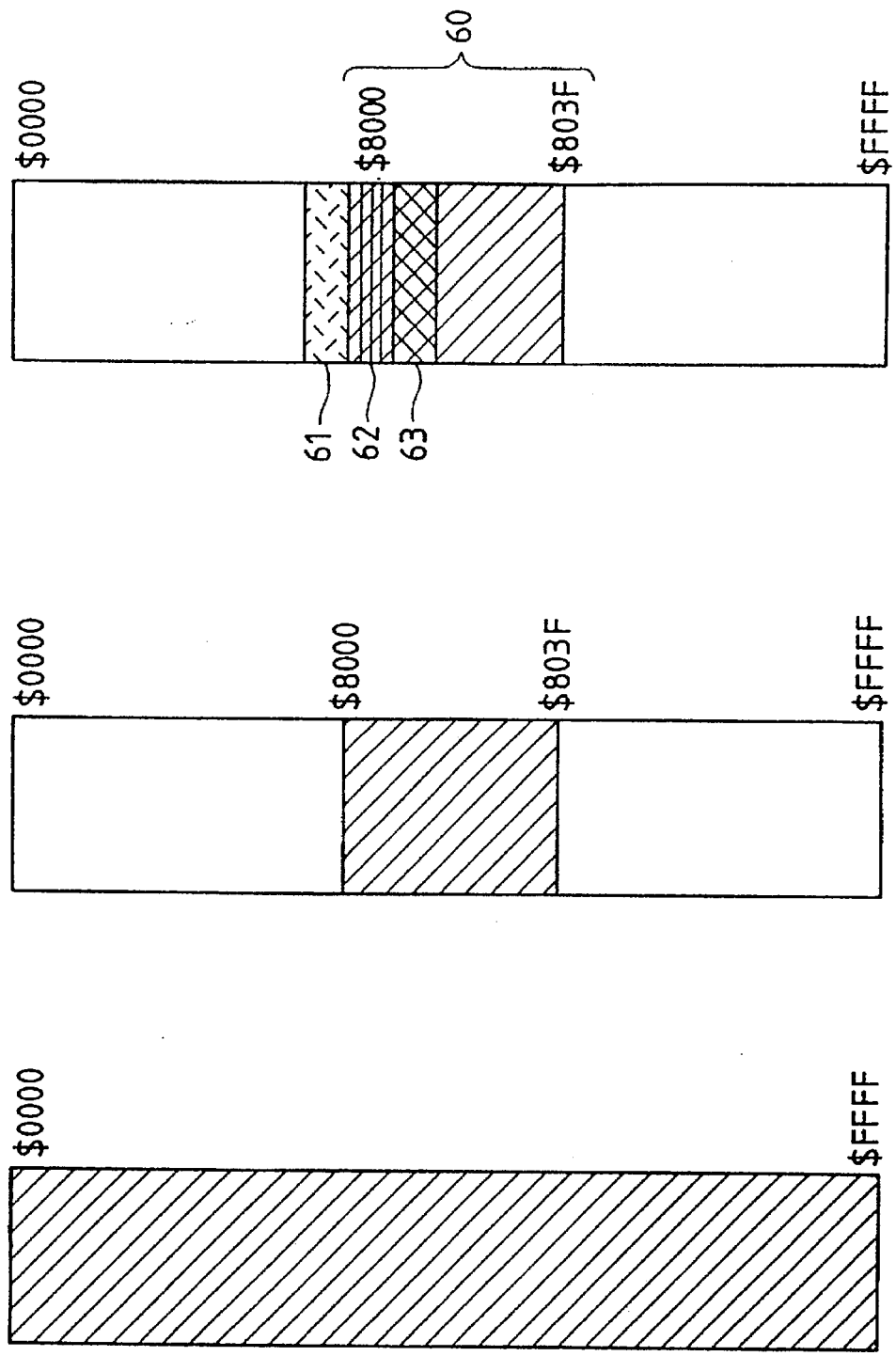

1

MICROCOMPUTER WITH PROGRAMMABLE ROM

BACKGROUND OF THE INVENTION

The present invention relates to a microcomputer widely used on consumer as well as industrial products and, more particularly, to a single-chip microcomputer incorporating a field-programmable PROM (Programmable Read-only Memory).

A single-chip microcomputer is a microcomputer for use on a relatively small-scale controller and comprises a CPU (Central Processing Unit), a ROM (Read-only Memory) for storing a program, a RAM (Random Access Memory) for arithmetic operations, and peripheral devices, such as a timer and A/D and D/A converters, all accommodated on one semiconductor chip. The ROM is a mask ROM in many cases or a field-programmable ROM in other cases. For this reason, buses including an address bus and a data bus are not externally available by way of signal pins. External pins are allocated, except for power supply and some control signals, to system interface signal pins that provide an interface with peripheral devices of the microcomputer and systems externally connected thereto. A mode of operation in which the CPU controls an application system through these system interface signal pins and an application program stored in the ROM is called an MCU mode. In addition to the MCU mode, the single-chip microcomputer generally has a test mode in which testing is performed by switching the system interface signal pins to single pins for an address bus, a data bus, and some internal signals, and a PROM mode in which a program and data are written into the PROM. With the single-chip microcomputer of the PROM type, switching from the MCU mode to the PROM mode is performed by making the system interface inactive and the PROM interface active through a mode select signal applied to a mode switch signal pin. That is, since the same signal pins are shared by the MCU mode and the PROM mode, the signal pins are selected by the mode switch signal to function in either mode.

Referring to FIG. 2, there is shown an example of a conventional single-chip microcomputer. Reference numeral 1 indicates the single-chip microcomputer; reference numeral 2 indicates a CPU; reference numeral 3 indicates a PROM, such as an EPROM (Erasable and Programmable Read-only Memory); reference numeral 4 indicates a RAM; reference numeral 5 indicates a peripheral functional block, including a timer, an A/D converter, a D/A converter and an LCD (Liquid Crystal Display) driver/controller; reference numeral 6 indicates an MCU interface having internal blocks necessary for the single-chip microcomputer 1 to operate in the MCU mode and to have an external-signal interfacing capability; reference numeral 7 indicates a PROM interface having internal blocks necessary for the microcomputer 1 to operate in the PROM mode and to have an external-signal interfacing capability; reference numeral 11 indicates a PROM data bus; reference numeral 12 indicates a PROM address bus Axx; reference numeral 13 indicates a PROM address bus Ayy; reference numeral 14 indicates a PROM address bus Azz; reference numerals 15 and 16 indicates a data bus and an address bus, respectively, used when the CPU 2 accesses the RAM 4 and the peripheral functional block 5; reference numeral 17 indicates an input/output bus used when the peripheral functional block 5 accesses the MCU interface 6; reference numerals 18 through 22 designate input/output signal buses respectively connected between the MCU interface and pin 40c of an I/O port, pin 40b of an I/O port, pin 40a of an I/O port, pin 41a of an I/O port, and pin 42 of an I/O port; reference numeral 23 indicates a PROM address Ax connected to the PROM address bus Axx 12; reference numeral 24 indicates a PROM address bus Ay connected to the PROM address bus Ayy 13; reference numeral 25 indicates a PROM address bus Az connected to the PROM address bus Azz 14; reference numeral 26 is a PROM data bus Dn connected to the PROM data bus 11 to be used in the PROM mode; reference numeral 40a indicates a pin shared between an I/O port in the MCU mode and an address port Axp in the PROM mode; reference numeral 40b indicates a pin shared between an I/O port in the MCU mode and an address port Ayp in the PROM mode; reference numeral 40c indicates a pin shared between an I/O port in the MCU mode and an address port Azp in the PROM mode; reference numeral 41a indicates a pin shared between an I/O port in the MCU mode and a data port Dnp in the PROM mode; reference numeral 42 indicates a pin for an I/O port used in the MCU mode; and reference numeral 43 indicates a PRM signal pin at which a PROM mode signal PRM is received for switching between the MCU mode and the PROM mode.

The single-chip microcomputer having the above-mentioned constitution operates as described below. First, the MCU mode in which an application system is controlled will be described. The MCU mode is set by making inactive the PRM signal to be used in designating the PROM mode. In the MCU mode, the CPU 2 reads a program and/or data from the PROM 3 through the PROM data bus 11, based addresses on the PROM address bus Axx 12, the PROM address bus Ayy 13, and the PROM address bus Azz 14. The CPU 2 then executes the read program by using data in the RAM 4 obtained through the data bus 15 and the address bus 16, by using an external signal read through the MCU interface and the pins 40a, 40b, 40c, 41a and 42, and by using data coming from the peripheral functional block 5. The CPU 2 stores the result of the execution in the RAM 4 and then outputs the result through the peripheral functional block 5, the MCU interface 6, and the pins 40a, 40b, 40c, 41a and 42 to control the application system. At this time, the PROM interface 7 is inactive and the pins 40a, 40b, 40c, 41a and 42 are all accessed through the MCU interface 6. Next, an operation of the above-mentioned microcomputer in the PROM mode will be described. The program to be used by the CPU 2 in the MCU mode is written in the PROM mode.

Switching from the MCU mode to the PROM mode is performed by making active the PROM mode signal PRM of the PRM signal pin 43. In the PROM mode, the PROM interface 7 goes active, while the MCU interface 6 goes inactive. The pins 40a, 40b, 40c and 41a provide an input/output port for access between the PROM interface 7 and a PROM writer, not shown. The pins 40a, 40b and 40c provide the PROM address ports Axp, Ayp and Azp. The pin 41a provides the data port Dnp for the PROM data (a program and/or fixed data) to be transferred between the PROM writer and the PROM 3. In this state, the PROM writer performs access, such as data writing and data verification, on the PROM 3 through the pins 40a, 40b, 40c, 41a, and the PROM interface 7. Referring to FIG. 3, there is shown an address space of the PROM 3, in which the solid-line frame indicates the overall address space (in this case, 64K words) of the PROM 3, while the cross-hatched portion indicates the accessible space of the PROM writer. That is, the PROM writer accesses all of the address area of the PROM 3. Consequently, in this case, the pins 40a, 40b, and 40c will actually consist of a total of 16 PROM address signal pins, even though only three individual pins are shown. In the PROM mode, the PROM writer uses all of these pins.

Thus, the above-mentioned conventional single-chip microcomputer requires many PROM writer interface signals because the PROM writer needs to write a program and/or data to the PROM over the entire address area. Therefore, it is necessary to switch a large number of the system interface signal pins in the MCU mode for use in receiving the PROM writer interface signals. On the other hand, once the above-mentioned microcomputer is mounted on the application system and the microcomputer peripheral devices are mounted on the application system to be set up, so that most functions of the application system are operated by the above-mentioned microcomputer and its program, it is impossible into switch to the PROM mode to write to the PROM. This is because most of the signal pins to be used as the PROM interface, or all of the signal pins, are connected with parts constituting part of the application system. If, after the application system has been set up as mentioned above operated as a system, and tested for its performance with an inline tester or the like, the operational coefficients, such as a correction coefficient obtained and stored in the PROM to control the system, and a control precision and other factors of the application system, may be enhanced not a little. However, the conventional single-chip microcomputer has not been able to handle such a constitution.

SUMMARY OF THE INVENTION

It is therefore an object of the present invention to provide a single-chip microcomputer incorporating a PROM that makes it possible to write data to the PROM when the single-chip microcomputer is mounted on a printed circuit board along with other parts constituting an application system.

Another object of the present invention is to provide a single-chip microcomputer which makes it possible to newly set a control constant or an operational coefficient on a microcomputer mounted on a printed circuit board with other parts constituting an application system and to test its performance with an inline tester, for example, thereby enhancing the system performance.

A microcomputer according to the present invention has an MCU mode in which a normal system control operation is performed, a PROM mode in which a program and/or data are written to a PROM incorporated in the single-chip microcomputer on a stand-alone basis, and an inline mode in which data are easily written to the PROM with the single-chip microcomputer mounted on a printed circuit board with other parts constituting an application system. Additionally, the above-mentioned microcomputer is provided with a mode select input signal pin for switching the operation mode to the above-mentioned inline mode.

Further, the microcomputer according to the preferred aspect of the present invention comprises an inline interface unit for writing data to the PROM in the inline mode.

Further, the microcomputer according to a specific aspect of the present invention comprises a multiplexer that allows the inline interface to fix a part of a PROM address bus to a high level and another part of the PROM address bus to a low level, and a serial interface unit for transferring a PROM address and data between a PROM writer and the microcomputer to be written to the PROM, wherein some or all of signal pins for interfacing between the inline interface and the PROM writer are assigned to a LCD driver/controller signal pin.

Further still, the system using the microcomputer incorporating a PROM according to another aspect of the present invention has within the PROM a first area for storing a dummy constant and a dummy operational coefficient to control the system, a second area for storing a real constant and a real operational coefficient obtained by testing system performance using the dummy constant and the dummy operational coefficient, and a third area for storing a flag for indicating that the real constant and the real operational coefficient have been stored in the second area, wherein the second area and the third area are set to an inline access area of the PROM.

As mentioned above, since the microcomputer according to the present invention has a plurality of mode select signal pins and provides an MCU mode in which a normal system control operation is performed, a PROM mode in which a program and/or data are written to the PROM incorporated in the microcomputer on a stand-alone basis, and an inline mode in which data are written to the incorporated PROM from a PROM writer via an inline probe, for example with the microcomputer mounted on a printed circuit board along with other parts constituting an application system, the operation mode of the microcomputer may be switched to the inline mode by means of a plurality of mode select signal pins or a single mode select signal pin.

In the microcomputer according to the present invention, an incorporated inline interface unit can provide an interface between the PROM writer and the incorporated PROM with the microcomputer mounted on the printed circuit board along with the parts constituting the application system.

In the microcomputer according to the present invention, a multiplexer disposed in the inline interface unit fixedly can set a part of the PROM address bus to a high level and another part to a low level.

In the microcomputer according to the present invention, the inline interface unit is provided with a serial interface unit for transferring a PROM address and data between the PROM writer and the microcomputer so as to be written into the PROM.

In the microcomputer according to the present invention, some or all of the signal pins for interfacing between the inline interface unit and the PROM writer are assigned to the LCD driver/controller signal pin, thereby providing an enhanced freedom in pin usage in the inline mode.

In the system using a microcomputer incorporating a PROM according to the present invention, the system has within the ROM a first area for storing a dummy constant and a dummy operational coefficient to control the system, a second area for storing a real constant and a real operational coefficient obtained by testing system performance using the dummy constant and the dummy operational coefficient, and a third area for storing a flag for indicating that the real constant and the real operational coefficient have been stored in the second area, so that, in the inline mode, after testing the system with the dummy constant and the dummy operational coefficient, the real constant and the real operational coefficient can be written to predetermined areas in the PROM to control the system.

BRIEF DESCRIPTION OF THE DRAWINGS

These and other objects, features and advantages of the present invention will be understood more clearly from the following detailed description with reference to the accompanying drawings, wherein

FIG. 3 is a diagram illustrating an address space of the PROM in the conventional microcomputer;

FIG. 4 is a diagram illustrating an address space of the PROM in the microcomputer according to the present invention;

FIG. 6 is a diagram illustrating an address space of a PROM in a microcomputer of still another embodiment of the present invention.

DESCRIPTION OF THE PREFERRED EMBODIMENTS

Figure 1:
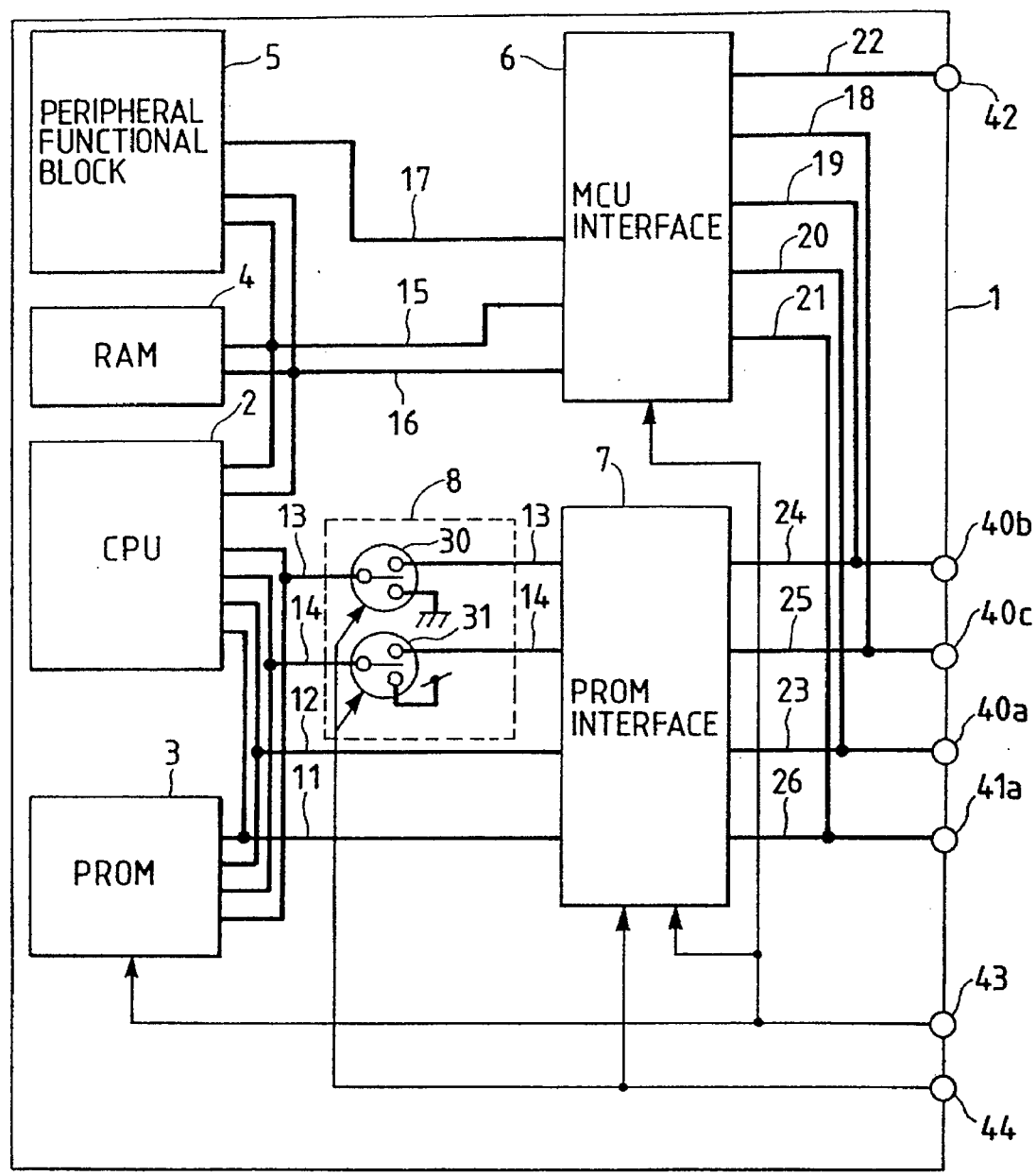
FIG. 1 is a schematic block diagram illustrating a microcomputer representing a first embodiment of the present invention.
Figure 2:
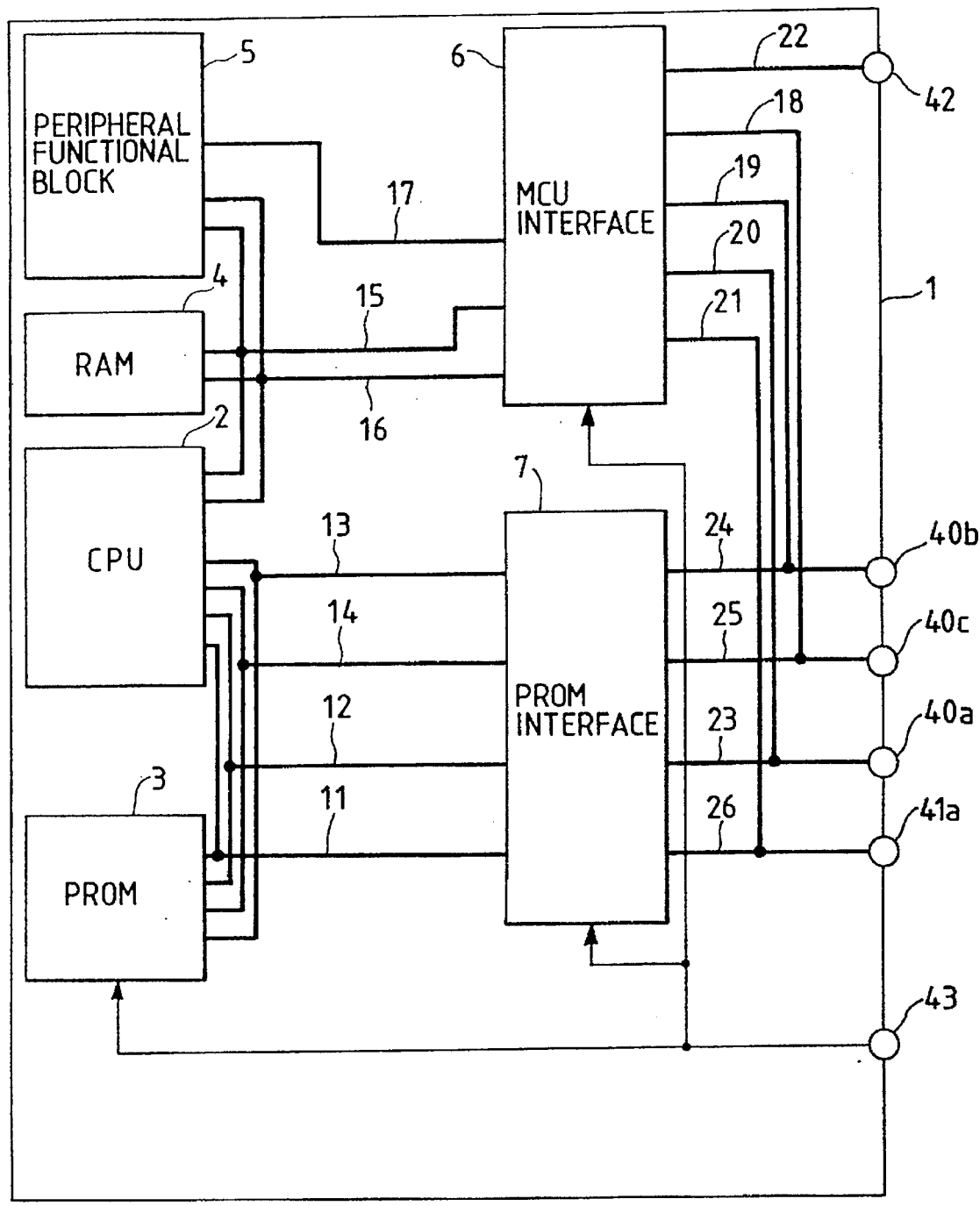
FIG. 2 is a schematic block diagram illustrating a conventional microcomputer.

Referring to FIG. 1, there is shown a schematic block diagram illustrating a microcomputer illustrating a first embodiment of the invention, in which parts similar to those in FIG. 2 are denoted by the same reference numbers. Now, referring to FIG. 1, reference numeral 8 indicates a multiplexer block composed of a first multiplexer 30 and a second multiplexer 31. In the figure, these multiplexers are shown each in a form of a switch for ease of functional understanding. But the form of the multiplexers is not limited thereto. The first multiplexer 30 is arranged along a PROM address bus Ayy 13 to switch the PROM address bus Ayy connected to a PROM side to ground potential. The second multiplexer 31 is arranged along a PROM address bus Azz 14 to switch the PROM address bus Azz 14 to a power supply potential. Reference numeral 40a indicates a pin that functions as an I/O port in the MCU mode and an address port Axp in the PROM mode. Reference numeral 40b indicates a pin that functions as an I/O port in the MCU mode and an address port Ayp in the PROM mode. Reference numeral 40c indicates a pin that functions as an I/O port in the MCU mode and an address port Azp in the PROM mode. Reference numeral 44 indicates an ILM signal pin at which an inline mode signal ILM is entered to switch an operating mode of the microcomputer to the inline mode. The ILM signal pin controls an inline interface composed of the multiplexer block 8 and a PROM interface 7.

Next, operations of the above-mentioned microcomputer will be described. First, an operation in the MCU mode is an operation for controlling an application system with the microcomputer according to the invention operating as a single-chip microcomputer. When a PROM mode select signal PRM and the inline mode select signal ILM are made inactive, the single-chip microcomputer is put in the MCU mode. The single-chip microcomputer operates in the MCU mode in the same manner in which the above-mentioned conventional single-chip microcomputer operates.

An operation in the PROM mode is an operation for writing an application program and/or data to the PROM 3 with the microcomputer operating as a stand-alone unit. In this operation, all of the PROM address buses Ax 23, Ay 24 and Az 25 are used to access the entire address space shown in FIG. 4, like the case of the above-mentioned conventional microcomputer. In this case, a program and/or data can be written by a PROM writer to the entire area of 64K words. Therefore, the number of the PROM address buses Ax 23, Ay 24 and Az 25 amounts to a total of 16. The PROM mode is set by making active the PROM mode select signal PRM.

Now, an inline mode of operation will be described. The inline mode is set by making active both the PROM mode select signal PRM and the inline mode select signal ILM or by making active only the inline mode select signal ILM. In the inline mode, the MCU interface 6 is put in a high impedance state with respect to the externals pins, that is, pin 40a, pin 40b and pin 40c. On the other hand, the PROM interface 7, constituting a part of the inline interface, transfers a signal applied to the pin 40a to the inside (the PROM side) and a signal applied to the pin 41a to both sides and applies a high impedance state to signals applied to the pins 40b and 40c. In this example, the PROM address bus Ayy 13 of the PROM is fixedly set by the multiplexer 30 to a low level, while the PROM address bus Azz 14 is fixed set to a high level. In this state, the PROM writer is connected to the pins 40a and 41a (it should be noted that signal lines such as a write enable and read enable are omitted). A PROM address bus Axx 12 consisting of six signal lines is connected to the pin 40a via the PROM interface 7. A PROM address bus Ayy 13 consisting of nine signal lines is fixedly set to the low level in logic level by the multiplexer 30. A PROM address bus Azz 14 consisting of one signal line is fixedly set to the high level in logic level by the second multiplexer 31. Then, in this state, the PROM writer can access that portion of the address space of the PROM 3 illustrated as a hatched portion consisting of 64 words shown, in FIG. 4. That is, when the PROM writer, not shown, specifies address $0000 via the pin 40a, address $8000 is accessed in the address space of the PROM 3, as shown in FIG. 4. By sequentially incrementing addresses applied to pin 40a, 64 words of data can be written from the PROM writer to the PROM 3 in the single-chip microcomputer 1. In many cases, an area around address $0000 in the address space of the PROM 3 is used as a vector address and a short jump instruction area. Therefore, it is impossible to write data to such an area; or, if possible, it is not advantageous. For this reason, a data write area in the inline mode is set to an area starting from address $8000 in this case. In the present embodiment, assigning some or all of the pins 40a and 41a to the LCD controller/driver proves to be more effective, as will be described.

It should be noted that details of a verification operation to be performed by the PROM writer when writing a program and/or data from the PROM writer to the PROM 3 are omitted. Generally, the verification operation checks to see if the program and/or data written by the PROM writer has an error. Actually, the PROM writer reads the program and/or data from the PROM 3 written by it to check for an error. The verification operation is performed via the PROM interface 7 in the PROM mode or via the inline interface in the inline mode.

Figure 5:
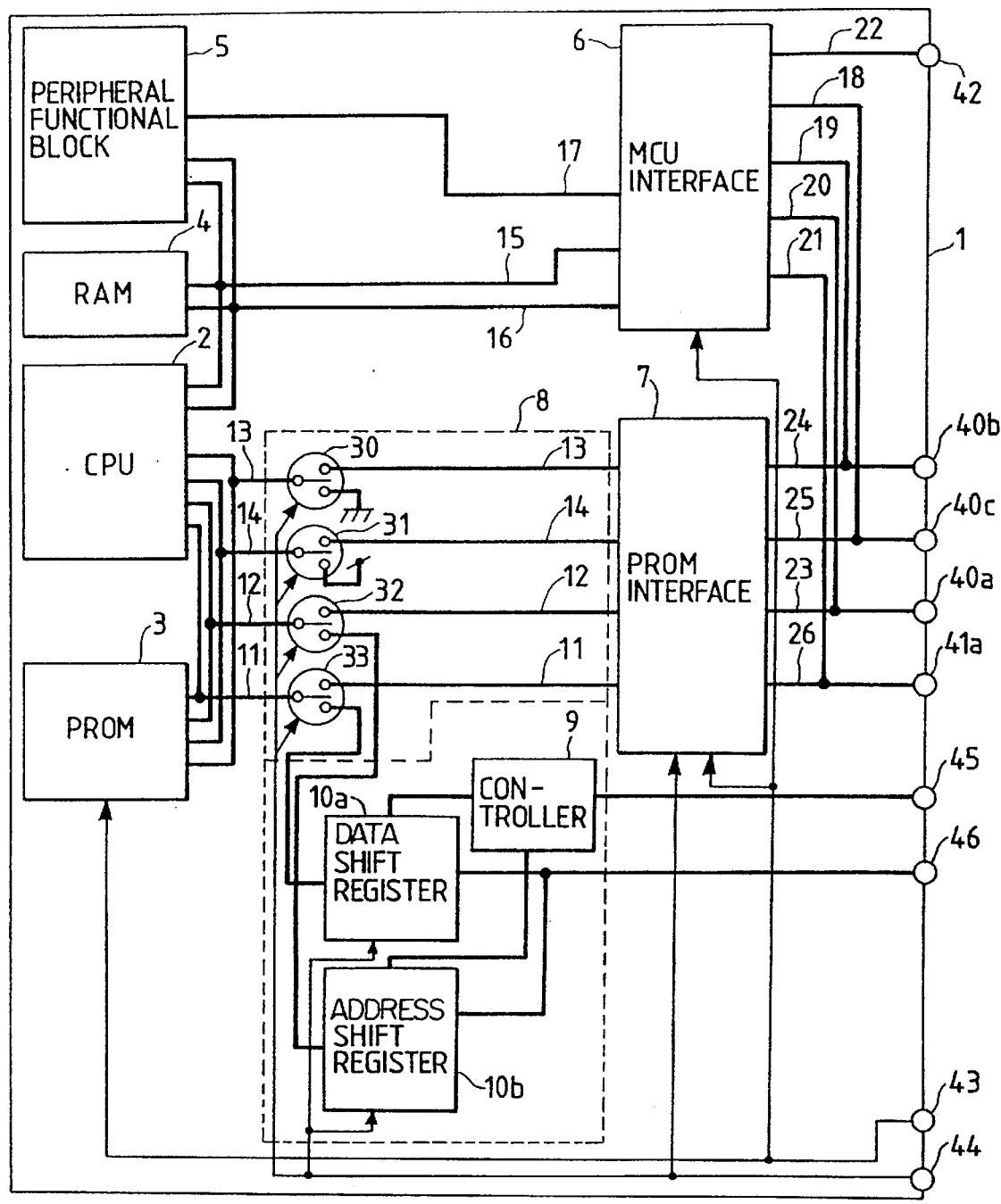
FIG. 5 is a schematic block diagram illustrating a microcomputer representing another embodiment of the present invention.

Now, referring to FIG. 5, a microcomputer forming a second embodiment of the present invention will be described. In FIG. 5, parts similar to those previously described with reference to FIG. 2 are denoted by the same reference numerals. Reference numeral 9 indicates a controller; reference numeral 10a a PROM data portion composed of shift registers; and reference numeral 10b a PROM address portion composed of shift registers. The controller 9, the PROM data portion 10a, and the PROM address portion 10b are included with the multiplexer block 8 and the PROM interface 7 to constitute a serial interface that allows a PROM writer, not shown, to access the PROM 3. Reference numeral 45 indicates a pin that functions as an I/O port in the MCU mode and a serial port in the inline mode. Reference numeral 46 indicates a pin that functions as an I/O port and a serial lock clock signal port in the inline mode.

Operations to take place in this embodiment will be described. The operations in the MCU mode and the PROM modes are the same as those of the embodiment of the FIG. 1. Since the address area of the PROM 3 used in this embodiment is the same as shown in FIG. 4, FIG. 4 is referenced in the following description. A multiplexer 8 comprises a third multiplexer 32 and a fourth multiplexer 33, in addition to the multiplexers 30 and 31 of FIG. 1. In the PROM mode, the third multiplexer 32 connects an address Ax of the PROM 3 entered at a pin 40a to a PROM address bus Axx 12. In the PROM mode, the fourth multiplexer 33 connects data Dn to be sent from a pin 41a to the PROM 3 to a PROM data bus 11. In this state, a program and/or data can be written from the PROM writer to the PROM 3 in the PROM mode in the write operation described with reference to FIG. 1.

An inline mode of operation will be described as follows. The inline mode is set by making active both a PROM mode select signal PRM of pin 43 and an inline mode select signal ILM of pin 44 or by making active only the inline mode select signal ILM. At this time, pin 45 provides a serial port for address and data signals coming from the PROM writer, and pin 46 provides a serial clock signal port for clocking the inputting/outputting of the address and data signals with the PROM writer through the pin 45. An interface between the PROM writer and the single-ship microprocessor 1 is provided by the pins 45 and 46 (control signals such as a write enable are omitted from the description). Data Dn and a PROM address Ax of the data Dn to be written from the PROM writer to the PROM 3 are serially supplied through the pin 45 to the PROM data portion 10a and the PROM address portion 10b respectively in synchronization with clock signals supplied at pin 46. Transfer of the PROM data Dn and the PROM address Ax to the PROM data portion 10a and the PROM address portion 10b is controlled by the controller 9 by counting the number of bits in these data. Then, from the PROM address portion 10b, the PROM address Ax is supplied to a PROM address bus Axx 12 via the third multiplexer 32. From the PROM data portion 10a, the PROM data Dn is supplied to a PROM data bus 11 via the fourth multiplexer 33 to be written into the PROM 3 at a predetermined PROM address. In this embodiment, assigning the pins 45 and 46 an LCD controller/driver proves to be more effective, as will be described.

A PROM verification operation in this embodiment is generally similar to that of the embodiment of FIG. 1. That is, for verification in the inline mode, the address of the PROM 3 is serially stored in the PROM address portion 10b from the PROM writer, not shown, via the controller 9 so as to be converted in parallel. The PROM address Ax of the PROM 3 is specified via the third multiplexer 32. The PROM data Dn at the specified PROM address Ax is read in parallel to the PROM data portion 10a via the fourth multiplexer 33. The PROM data Dn written to the PROM data portion 10a is serially read by the PROM writer, not shown, via the controller 9 and the pin 45 to be verified. This serial transfer is performed in synchronization with the clock signals supplied at the pin 46. Thus, except for the serial transfer of the PROM address Ax and the PROM data Dn from the PROM writer, not shown, the verification operation is the same as that of the embodiment of FIG. 1.

In the description of the above-mentioned embodiment, switching to the inline mode is performed by means of the inline mode select signal ILM and/or the PROM mode select signal PRM for ease of understanding. It will be appreciated that, since the single-chip microcomputer is provided with signal pins for switching to the test mode and for causing a reset operation, switching between various operation modes can be effected by using combinations of these signal pins in addition to the above-mentioned select signals.

Now, referring to FIG. 6, there will be described a microcomputer operation representing still another embodiment of the present invention. In FIG. 6, a frame of solid lines indicates an entire address space of the PROM as with that of FIG. 4. Reference numeral 60 indicates an inline area accessible in the inline mode. Reference numeral 61 indicates a first area for storing a dummy constant and a dummy operational coefficient. The first area is provided outside the inline area. Reference numeral 62 indicates a second area for storing a real constant and a real operational coefficient to be obtained after system testing. Reference numeral 63 indicates a third area for storing a flag for indicating that the real constant and operational coefficient have been stored in the second area. With the dummy constant and operational coefficient stored in the first area along with a control program, the microcomputer is mounted on a printed circuit board with other parts constituting an application system to be tested. If desired initial performance, such as controllability, cannot be obtained, such real constant and operational coefficient are considered as providing the desired performance. The obtained real constant and operational coefficient are written by the PROM writer to the second area through a prober or the like. At the same time, the above-mentioned flag is written to the third area. Then, when the system is started, the microcomputer checks the third area for the flag. If the flag is found, the microcomputer controls the system by using the constant and coefficient stored in the second area. Thus, the system provides the desired control performance.

As described according to the invention, the microcomputer uses a signal for switching to the inline mode, so that single-chip microcomputer functions can be set to the inline mode in addition to the MCU and PROM modes provided by the conventional single-chip microcomputer. Therefore, the novel setup provides a different method in which the PROM writer accesses the incorporated PROM than that in the conventional PROM mode. This makes it possible to test the performance of an application system, including the single-chip microcomputer, with the single-chip microcomputer mounted on a printed circuit board with other parts and then write an operational correction coefficient and the like for enhancing the system performance into the incorporated PROM through probing or the like.

According to the present invention, the inline interface for the inline mode can easily change the interface capability of the single-chip microcomputer so that it adapts to the inline mode.

According to the present invention, the inline interface has means for fixedly setting a part of the PROM address bus to the high level and another part to the low level, thereby eliminating a need for the PROM writer to access the entire address area of the incorporated PROM in the inline mode. This reduces the number of PROM address buses connecting the PROM writer, thereby allowing the PROM a to easily write correction coefficient and the like data to the incorporated PROM with the single-chip microcomputer mounted on the printed circuit board.

According to the present invention, the inline interface can access the PROM address and data via the serial interface, so that the number of interface signal lines connecting the PROM writer in the inline mode can be reduced significantly, thereby allowing the PROM writer to easily write a correction coefficient and the like data to the incorporated PROM with the single-chip microcomputer mounted on the printed circuit board.

According to the present invention, the signal ports to be connected to the inline interface are assigned to the LCD driver/controller I/O pin, so that the interface with the PROM writer can be provided freely in the inline mode by means of probing or the like. That is, normally, the printed circuit board and the LCD are not physically connected with each other by wiring or soldering; rather, they are often electrically connected by means of conductive pads or the like which connect to connection pads of a copper pattern formed on LCD connection points. As a result, on the printed circuit board, the connection pads remain unused after mounting until a final assembly of a system set. Therefore, the novel setup allows the probing for a PROM writer connection to be freely performed through these unused pads.

What is claimed is:

1. A microcomputer having a programmable ROM, said microcomputer comprising:

a programmable ROM;

an external pin, connected to said programmable ROM, to which a mode select signal is supplied; and control means, connected to said external pin, responsive to said mode select signal for controlling said microcomputer to operate in one of three modes, including an MCU mode in which an application system is controlled by an application program which is stored in said programmable ROM, a PROM mode in which said application program is written to said programmable ROM, and an inline mode in which predetermined data is written to a part of said programmable ROM while said microcomputer is mounted on a user system including all components of an application system, wherein said control means comprises at least an inline mode interface which includes a multiplexer for setting a part of a PROM address bus to a high level and another part of said PROM address bus to a low level in said inline mode.

2. A microcomputer having a programmable ROM according to claim 1, wherein said inline mode interface comprises a serial interface for transferring a PROM address and data between a PROM writer and said PROM incorporated in said microcomputer.

3. A microcomputer with a programmable ROM according to claim 1, wherein at least some of a plurality of pins for interface signals transferred between said inline interface and said PROM write operate as LCD driver/controller signal pins.

4. A system using a microcomputer incorporating a PROM, have a first area for storing a dummy constant and a dummy operational coefficient for controlling said system, a second area for storing a real constant and a real operational coefficient obtained after testing system performance by using said dummy constant and said dummy operational coefficient, and a third area for storing a flag for indicating that said real constant and said real operational coefficient have been stored in said second area.

5. A system according to claim 4, wherein said second area and said third area are set to an inline mode access area in said PROM.

6. A single-chip microcomputer comprising:

a central processing unit;

a programmable ROM for storing programs to be run by said central processing unit;

a plurality of external pins for effecting input/output of signals;

a MCU interface connected between said central processing unit and said plurality of external pins;

a PROM interface connected between said programmable ROM and said plurality of external pins in parallel with said MCU interface;

a first external mode select pin connected to supply a first mode select signal to select either said MCU interface or PROM interface for operation to connect said central processing unit to said plurality of external pins;

an in-line interface connected between said programmable ROM and said plurality of external pins, and including said PROM interface and a multiplexer for setting a part of PROM address lines to a predetermined level; and a second external mode select pin connected to supply a second mode select signal to control the operation of said in-line interface to provide access via said plurality of external pins to only a predetermined part of said programmable ROM.

7. A single-chip microcomputer according to claim 6, wherein a plurality of address lines and a data line are connected between said programmable ROM and said PROM interface, and wherein said multiplexer is connected to at least some of said address lines.

8. A single-chip microcomputer according to claim 6, wherein a plurality of address lines and a data line are connected between said programmable ROM and said PROM interface, and wherein said in-line interface includes:

a data shift register connected to receive data from an external pin; and an address shift register connected to receive addresses from an external pin;

wherein said multiplexer is provided, responsive to said second mode select signal, for setting a first part of said address lines to a high level, for setting a second part of said address lines to a low level, for selectively connecting the remainder of said address line to said address shift register and for selectively connecting said data lines to said data shift register.

9. A single-chip microcomputer according to claim 8, wherein said data shift register and said address shift register are connected to the same external pin, said microcomputer further including a controller, disposed in parallel between said data shift register and said address shift register and said same external pin, responsive to clock signals for controlling the operation of said data shift register and said address shift register.

* * * * *